J. M. NORDSTRÖM.
AUTOMATIC BRAKE.
APPLICATION FILED JUNE 11, 1907.
907,169.
Patented Dec. 22, 1908.
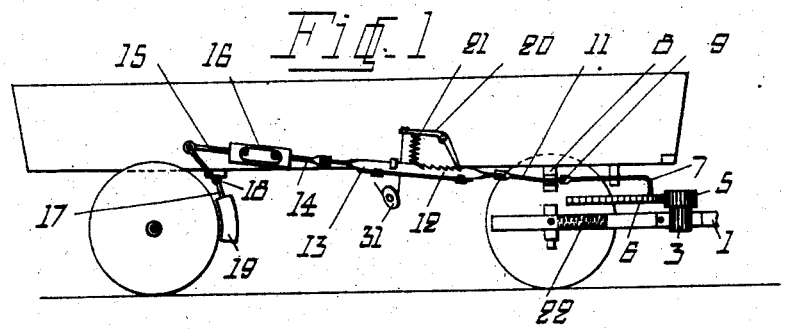
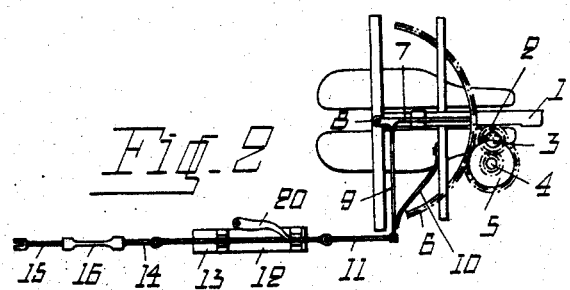
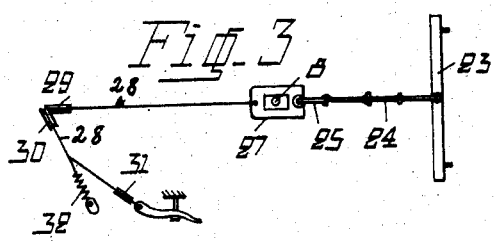
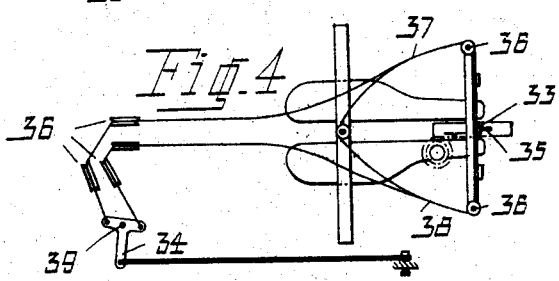
Witnesses:
Inventor:
Jöns Mårtenson Nordström
By John R. Nolan
Attorney

UNITED STATES PATENT OFFICE.

JÖNS MÅRTENSON NORDSTRÖM, OF COPENHAGEN, DENMARK.

AUTOMATIC BRAKE.

No. 907,169.        Specification of Letters Patent.        Patented Dec. 22, 1908.

Application filed June 11, 1907. Serial No. 378,346.

*To all whom it may concern:*

Be it known that I, JÖNS MÅRTENSON NORDSTRÖM, residing at Vesterbrogade 136, Copenhagen, Denmark, have invented certain new and useful Improvements in Automatic Brakes; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to an automatic brake for wheeled vehicles, such, for example, as two-horse carriages.

The invention, generally stated, comprises various novel features of construction and organization whereby the brake or brakes shall be effectively applied to the wheels of the vehicle when the horses are checked or backed; whereby the brake or brakes shall by automatically released when the horses start forward, and whereby the brake or brakes can be readily rendered inactive when it is desired to back the vehicle without applying the brakes, as will be hereinafter described and claimed.

In the annexed drawings, which illustrate a preferred form of embodiment of my invention,—Figure 1 is a side view of a vehicle equipped with brake mechanism. Fig. 2 is a partial plan of the mechanism, the vehicle being mainly omitted. Fig. 3 is a partial plan illustrating the brake releasing devices. Fig. 4 is a partial plan illustrating the devices for rendering the brake mechanism temporarily inactive.

The pole or tongue 1 of the vehicle is longitudinally movable in respect to the body of the latter so that when the reins are tightened, the pole will be drawn backward by the horses. Suitably located on this pole is a laterally-projecting tooth, 2, in the path of which is a gear wheel 3 which, being engaged and actuated by the tooth on the rearwardly moving pole, transmits the movement to a horizontal gear segment 6 through the associated gear wheels 4 and 5. This segment is carried by an arm 7 of a bell crank lever which is pivoted on the king bolt 8 so as to turn in a horizontal plane, the other arm 9 of the lever being pressed backward by a suitably disposed spring 10. A link 11 connects the outer end of the arm 9 with one end of a ratchet bar 12 which is slidingly mounted on a rail 13 carried by the vehicle body. The opposite end of this bar is connected by means of a two-part rod 14,15, with a brake lever 17 carrying the usual brake block or beam 19; the parts of the rod being united by an ordinary screw turn-buckle 16.

When the segment is actuated by the backward thrust of the pole, as above indicated, the arm 9 of the bell crank lever is swung forward against the spring 10, thereby pulling the connections with the brake lever, and forcing the brake member effectively against the wheel or wheels of the vehicle.

Pivoted to the vehicle body, at a point adjacent to the ratchet bar, is a dog or pawl 20 which is held normally in engagement with the teeth of said bar by the action of a suitably disposed spring 21, and hence when the lever arm 9 is advanced as just described, the dog or pawl by its engagement with the proximate tooth or teeth of the ratchet bar, locks the brake in active position.

A spring 22 located in two telescopic relatively movable shells, one on the forward axle and the other on the inner end of the pole, is compressed by the backward movement of the pole, so that when the brake is released, as hereinafter described, the said spring, expanding, assists in pushing the pole outward.

In Fig. 3 is shown a simple and efficient means to disengage the dog or pawl from the ratchet bar in a manner to permit the release of the brake. This means comprises a spring bar 23 carried by a rod 24 which is connected by means of a hook 25 with a slide frame 27, which frame conveniently embraces the king bolt 8 and is guided thereby. A wire rope 28, or other flexible strand, is connected with the frame 27 and passed rearward therefrom to and about a sheave 29 journaled on the vehicle body, and then over suitably located sheaves 30 and 31 to the arm of the dog or pawl 20 where it is secured. A spring 32 secured at its respective ends to the rope 28 and the body of the vehicle, tends to pull the rope and its connections toward the dog or pawl. By this construction it will be seen that when the horses, in starting, begin to draw in or bow the spring bar 23, the pawl, by the movement of the flexible connections, is disengaged from the ratchet bar, thus permitting the release of the brake. The tension of the spring 32 is increased by the pull upon the rope 28, and therefore this spring, upon its recoil when the horses cease to draw, retracts the spring bar 23 to its previous position and permits the pawl to resume its normal engaging condition.

In Fig. 4 is shown a simple and efficient means to render the brake temporarily inactive when it is desired to back the vehicle without applying the brake to the wheel or wheels. This means comprises a block 33 which is movable transversely of the pole and into the rearward path of a suitably-located stop or abutment 35 on the latter. The block is connected with two wire ropes or other flexible strands, 37, 38, which are passed in opposite directions over suitably located sheaves 36, and are connected respectively to the arms of a T-lever 34 which is pivoted to the vehicle body as at 39. This lever is connected by means of a link to a suitable handle by the manipulation of which by the driver, the lever can be actuated to effect through the connections described, the movement of the block into or from the path of the abutment on the pole, as desired. When the block is moved into the path of the abutment, the retrograde movement of the pole is prevented, and in consequence the brake is unaffected by the backing of the vehicle.

It is to be noted that the gear segment is appropriately mounted to permit the fore wheels of the vehicle to be properly turned independently of the hind wheels without affecting the operation of the brake devices, and also that the mechanism is in all other respects constructed and arranged to permit the free and unobstructed operation of the wheels and springs.

What I claim is—

1. In an automatic brake for wheeled vehicles, the combination with a vehicle body, of a pole longitudinally-movable relatively thereto, a horizontally-disposed gear segment pivotally mounted on said body with its axis of rotation through the king-bolt of the vehicle, a series of co-acting gear wheels arranged adjacent to the segment and the pole, one of which wheels is in mesh with the toothed periphery of the segment, means on the pole for engaging and actuating another of said wheels when the pole is longitudinally moved, a brake member, and connections between the same and the segment.

2. In an automatic brake for wheeled vehicles, the combination with a vehicle body, of a pole longitudinally movable relatively thereto, an angle lever pivotally mounted on said body with its center or fulcrum through the king-bolt of the vehicle, a gear segment carried by the forwardly-extending arm of the lever, gearing between the pole and the toothed periphery of the segment, a brake member, a link pivotally connected with the other arm of the lever, and connections between said link and the brake member.

3. In an automatic brake for wheeled vehicles, the combination with a vehicle body, of a pole longitudinally movable relatively thereto, an angle lever pivotally mounted on said body, a gear segment carried by one arm of the lever, a spring acting to maintain said arm pressed normally backward, gearing between the pole and the toothed periphery of the segment, a brake member, and connections between the other arm of the lever and said brake member.

4. In an automatic brake for wheeled vehicles, the combination with a vehicle body, of a pole longitudinally movable relatively thereto, a gear segment pivotally mounted on said body, gearing between the pole and segment, a brake member, connections, including a ratchet bar, between the brake member and the segment, a pawl adapted normally to engage the ratchet-bar, and means whereby the pawl is disengaged from said bar.

5. In an automatic brake for wheeled vehicles, the combination with a vehicle body, of a pole longitudinally movable relatively thereto, a gear segment pivotally mounted on said body, gearing between the pole and segment, a brake member, connections, including a ratchet-bar, between the brake member and the segment, a pawl adapted normally to engage the ratchet bar, a spring member, and connections between the same and the pawl, whereby, when said member is actuated by a forward pull, the pawl is disengaged from said bar.

6. In an automatic brake for wheeled vehicles, the combination with a vehicle body, of a pole longitudinally movable relatively thereto, a gear segment pivotally mounted on said body, gearing between the pole and segment, a brake device, connections between the same and the segment, an abutment on the pole, a block movable into and from the rearward path of said abutment, and manually-operated means for moving said abutment.

In testimony, that I claim the foregoing as my invention, I have signed my name in presence of two subscribing witnesses.

JÖNS MÅRTENSON NORDSTRÖM.

Witnesses:
L. F. C. CHRISTENSEN,
D. CHRISTENSEN.